United States Patent
Park

(10) Patent No.: US 6,661,792 B1
(45) Date of Patent: Dec. 9, 2003

(54) APPARATUS FOR PROCESSING DATA PACKET OF ETHERNET SWITCH SYSTEM AND METHOD THEREOF

(75) Inventor: Sung Joon Park, Kyungki-Do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/494,023

(22) Filed: Jan. 31, 2000

(30) Foreign Application Priority Data

Feb. 1, 1999 (KR) .......................................... 1999/3309

(51) Int. Cl.$^7$ ................................................. H04B 3/20
(52) U.S. Cl. ................... 370/392; 370/395.53; 370/429
(58) Field of Search ................................ 370/389, 392, 370/395.53, 400, 401, 428, 429, 445, 402; 709/224

(56) References Cited

U.S. PATENT DOCUMENTS

| | | | |
|---|---|---|---|
| 5,915,097 A | 6/1999 | Chao | 395/200.68 |
| 5,917,821 A | * 6/1999 | Gobuyan et al. | 370/392 |
| 5,999,536 A | * 12/1999 | Kawafuji et al. | 370/401 |
| 6,151,322 A | * 11/2000 | Viswanath et al. | 370/395.53 |
| 6,246,680 B1 | * 6/2001 | Muller et al. | 370/389 |

* cited by examiner

Primary Examiner—Wellington Chin
Assistant Examiner—Yvonne Q. Ha
(74) Attorney, Agent, or Firm—Morgan, Lewis & Bockius LLP

(57) ABSTRACT

A method and apparatus for processing a data packet of an Ethernet switch system in which packet information is transferred from a first device to a second device on the basis of field information of a packet inputted through an Ethernet, including the steps of: detecting a first address from a packet inputted to a predetermined input port of a MAC through the Ethernet; determining an output port of a packet to be detected from the MAC on the basis of the first address provided from the MAC on a real time basis and a MAC address stored in a search memory; and detecting whether the determined output port is ready to use or not and transferring a packet detected from the MAC to the Ethernet through the output port. By adopting a structure in which the plurality of MACs and the single search engine are implemented on the same layer and the single search engine is connected to every MAC, the search engine performs the address searching operation and determines the output port of the packet while the packet is being processed by the MAC, so that the speed in transferring the packet is much increased.

19 Claims, 3 Drawing Sheets

APPARATUS FOR PROCESSING DATA PACKET OF ETHERNET SWITCH SYSTEM AND METHOD THEREOF

This application claims the benefit of Korean patent application No. 3309/1999, filed Feb. 1, 1999, which is hereby incorporated by reference.

BACKGROUND OF THE INVENTION

1. Field of the Invention

The present invention relates to an Ethernet switch system, and more particularly, to an apparatus for processing a data packet of a layer 2 Ethernet switch system, and a method thereof.

2. Description of the Background Art

FIG. 1 is a schematic view of a layer 2 Ethernet switch system in accordance with a conventional art.

As shown in the drawing, the conventional layer 2 Ethernet switch system includes a media access control (termed as MAC, hereinafter) 11 connected to an ethernet network 10 through a physical layer (not shown) and detecting a packet from an inputted bit stream; a search engine 12 for searching MAC addresses stored in a search memory 13 and determining an output port of the packet detected by the MAC 11; a search memory 13 for storing overall MAC addresses of the Ethernet switch system; a packet memory 14 for temporarily storing the output packet of the search engine 12; and a control unit 15 for controlling the operation of the whole system. A plurality of input/output FIFOs (first-in-first-out) buffers 4a, 4b, 5a, 5b, 6a and 6b are connected between the MAC 11, the search engine 12 and the packet memory 14, so as to buffer the packet.

In this respect, the Ethernet network 10 is connected to a plurality of devices (not shown) and implemented as a twisted pair cable, a coaxial cable and an optical fiber.

The operation of the layer 2 Ethernet switch system in accordance with the conventional art constructed as described above will now be explained with reference to the accompanying drawings.

FIG. 2 shows a frame structure of a data packet on an IEEE 802.3 standard. As shown in the drawing, each data packet includes a preamble, a start of frame delimiter (SFD) indicating a start of a data portion of a message, a destination address (DA) field, a source address (SA) field, a length/type field, a data field having a real packet data, and a frame check sequence (FCS) of error information.

When a bit stream including a data packet in the frame structure is inputted to a predetermined port of the Ethernet switch system through the Ethernet 10, it is matched in the physical layer (not shown) and is inputted to the MAC layer.

As well as detecting the preamble and the SFD of the data packet, the MAC 11 sequentially detects the destination address (DA), the source address (SA), the length/type, the data and the frame check sequence (FCS), and then performs a cyclic redundancy checking (CRC) in the FCS, so as to check whether the inputted packet is valid or not.

Upon checking, if the packet is valid one, the MAC 11 outputs the detected packet to the first FIFO 4a.

After the packet detecting operation by the MAC 11 is completed, that is, after the packet detected by the MAC 11 is outputted to the first FIFO 4a, the search engine 12 accesses the packet from the first FIFO 4a, and searches the search memory 13 according to a pre-defined search algorithm so as to determine an output port of the accessed packet.

That is, the search engine 12 reads the destination address (DA) and a source address (SA) of a header of the packet and checks whether or not the destination address as read is stored in the search memory 13.

If the destination address is stored in the search memory 13, the search engine 12 searches a port number corresponding to the destination address as read from the search memory 13 and determines an output port of the packet. And, as the output port of the MAC packet is determined, the search engine 12 outputs an ending signal to the control unit 15 and temporarily stores the packet in the packet memory 14 through the FIFO 5a.

Upon receipt of the ending signal from the search engine 12, the control unit 15 checks the state of the FIFOs 5b and 4b, or 5b and 6b and of the MAC 11. In case that the FIFOs and the MAC 11 are not busy, the control unit 15 controls the FIFOs 5b and 4b, or 5b and 6b and of the MAC 11 so that the packet stored in the packet memory 14 is transferred to the Ethernet 10.

On the other hand, if the destination address of the packet is not stored in the search memory 13, the search engine 12 records an MAC address (a source address and a destination address) of the currently inputted packet in the search memory 13 and then stores a corresponding packet in the packet memory 14.

Accordingly, the packet stored in the packet memory 14 is flooded under the control of the control unit 15. That is, in case that the destination address of the packet is not recorded in the search memory 13 or in case that the destination address of the packet is all '1' (broadcast address), the packet is transferred to all of the MAC ports other than the MAC port that currently received the packet.

The search engine 12 determines an output port by reading the destination address and the source address from the packet stored in the first FIFO 4a at the time point when the packet detected by the MAC 11 is stored in the first FIFO 4a. That is, the search engine 12 does not access the first FIFO 4a until all of the packets shown in FIG. 2 are detected.

As a result, a transfer time of the packet received by the input port of the MAC to the output port of the MAC is lengthened, causing a problem in that the whole system is degraded in view of efficiency.

In addition, in case that a resource is additionally included so as to resolve the problem, its production cost is increased as much.

SUMMARY OF THE INVENTION

Therefore, an object of the present invention is to provide an apparatus for processing a data packet of an Ethernet switch system which is capable of improving an efficiency of the system by minimizing a delay time in transferring the packet from an input port to an output port, and a method thereof.

Another object of the present invention is to provide an apparatus for processing a data packet of an Ethernet switch system which can be implemented by a few resources and a small memory structure, and a method thereof.

To achieve these and other advantages and in accordance with the purposed of the present invention, as embodied and broadly described herein, there is provided an apparatus for processing a data packet of an Ethernet switch system in which packet information is transferred from a first device to a second device based on a field information of the packet inputted through an Ethernet, comprising at least one MAC for detecting the field information of the packet received from the first device through the Ethernet, and at least one search engine for determining an output port of the packet to be outputted to the second device based on a source address and a destination address provided from the MACs on a real-time basis before the MAC completes the detecting operation of the packet, wherein the search engine is directly connected to the MAC.

In order to obtain the above objects, there is also provided an apparatus for processing a data packet of an Ethernet switch system, comprising at least one MAC for detecting the packet from a bit stream, a search memory where MAC addresses are stored, at least one search engine positioned at the same layer with the MAC and determining an output port of the packet before the MAC completes the detecting operation of the packet based on an address detected and provided by the MAC on a real-time basis and the MAC address searched in the search memory, wherein the search engine is directly connected to the MAC, FIFOs for buffering the packet detected by the MAC, and a control unit for performing an overall control operation.

In order to obtain the above objects, there is also provided a method for processing a data packet of an Ethernet switch system in which packet information is transferred from a first device to a second device on the basis of field information of the packet inputted through an Ethernet, comprising the steps of, detecting a first address from the packet inputted to a predetermined input port of at least one MAC through the Ethernet, determining an output port of the packet with at least one search engine before the MAC completes the detecting operation of the packet based on the first address provided from the MAC on a real-time basis and a MAC address stored in a search memory, checking whether the output port is available for use or not, and transferring the packet detected from the MAC to the Ethernet through the output port.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
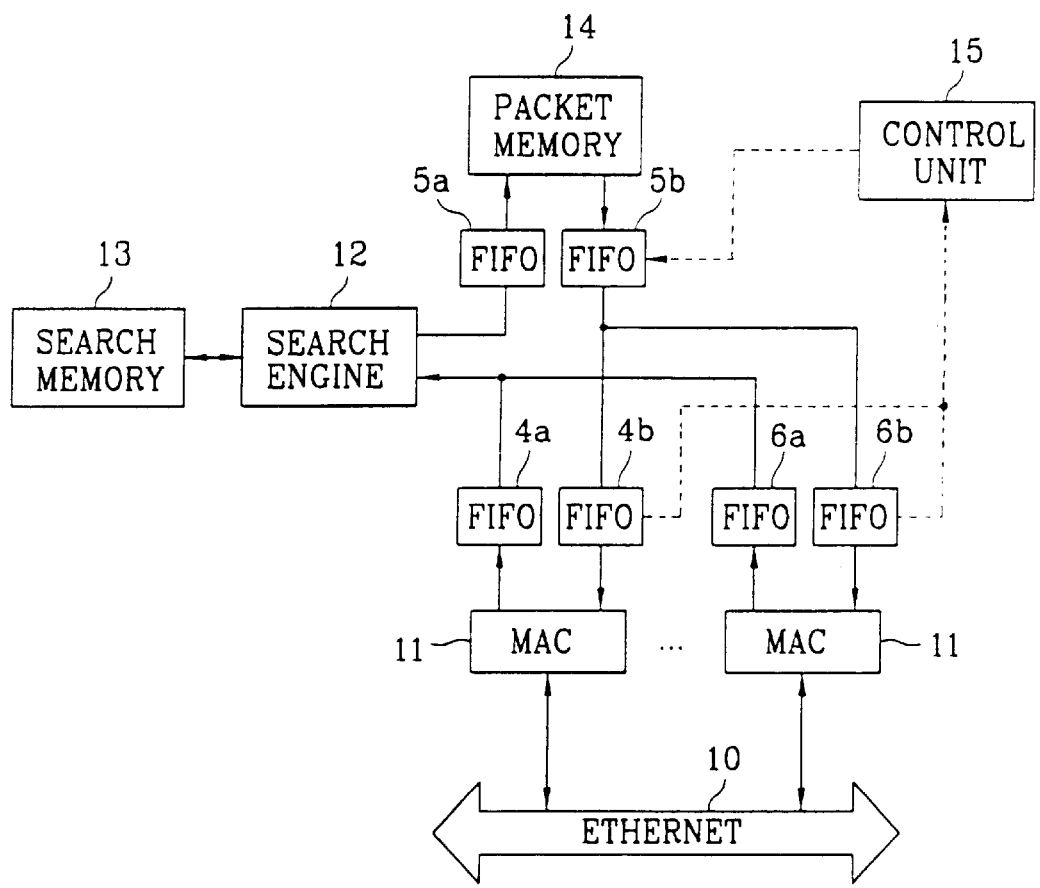
FIG. 1 is a schematic view of a layer 2 Ethernet switch system in accordance with a conventional art.
Figure 2:
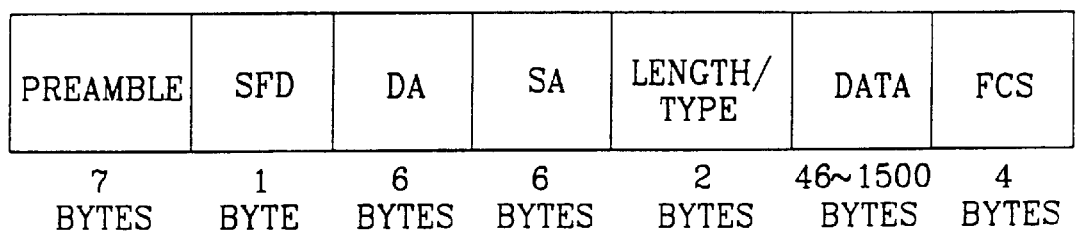
FIG. 2 shows a frame structure of a data packet on an IEEE 802.3 standard in accordance with the conventional art.
Figure 3:
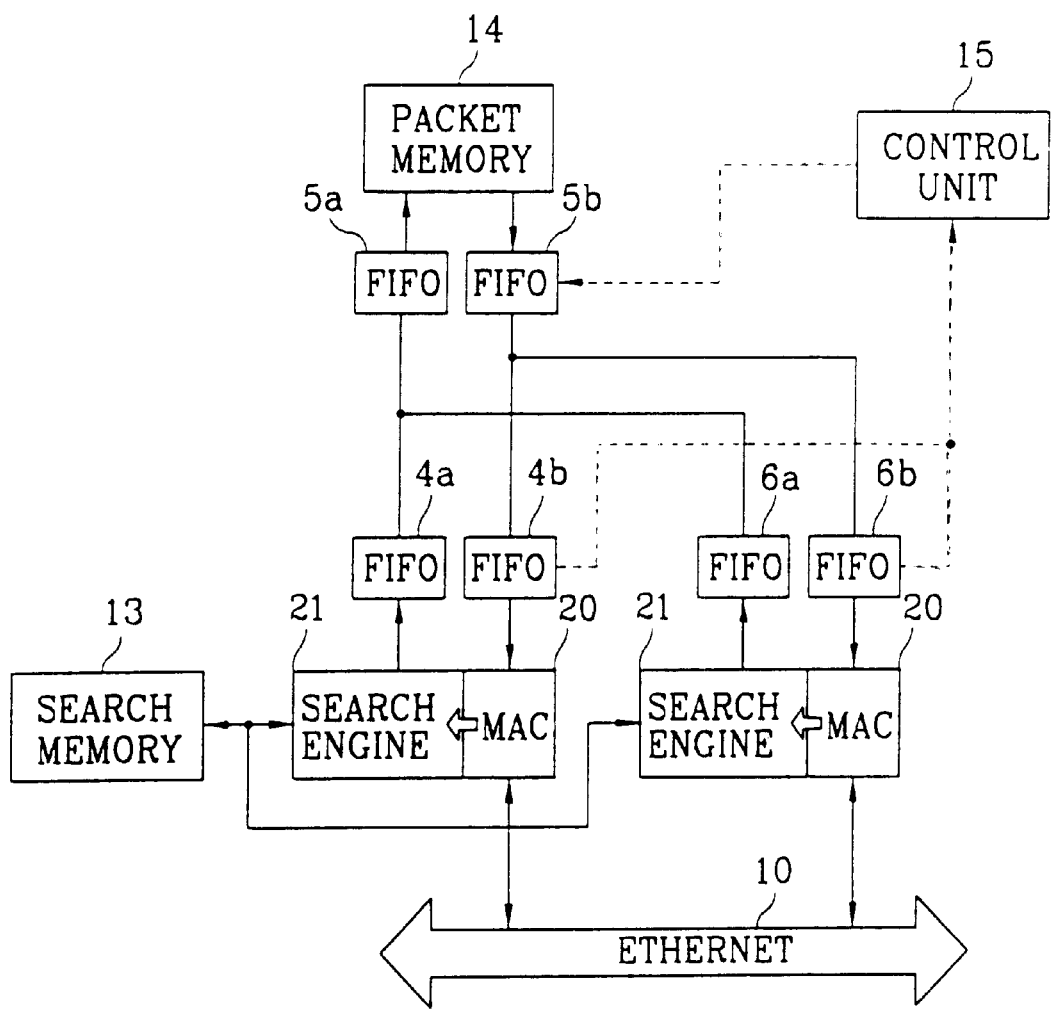
FIG. 3 is a schematic block diagram of an apparatus for processing a data packet of an Ethernet switch system in accordance with a first embodiment of the present invention.

FIG. 3 is a schematic block diagram of an apparatus for processing a data packet of an Ethernet switch system in accordance with a first embodiment of the present invention.

This drawing shows the same basic elements for construction for the Ethernet switch system as in the conventional art, except for the following aspects: first, a plurality of MACs 20 and the search engines 21 are implemented on the same layer; second, a single search engine 21 is connected to every MAC and every search engine 21 holds the single search memory 13 in common.

For the same elements, the same reference numerals are given.

The MAC 20 and the search engines 21 have the same operation frequency, and the search memory 13 has an operation frequency higher than that of the MAC 20.

The operation of the apparatus for processing the data packet of the Ethernet switch system in accordance with the first embodiment constructed as described above will now be explained with reference to FIG. 3.

The MAC 20 detects a packet from a bit stream inputted through the Ethernet 10 and a physical layer (not shown). As a preamble and an SFD is detected from the bit stream, the MAC 20 detects a destination address DA and a source address SA existing in a header of the packet and provides it to the search engine 21 on a real-time basis.

Thereafter, like in the conventional art, the MAC 20 sequentially detects a length/type, a data and a frame check sequence (FCS) to check whether the detected packet is a valid one.

While the MAC 20 is detecting the remaining field information (i.e., the length/type, the data and the FCS), the search engine 21 compares the destination address and the source address provided from the MAC 20 and the MAC address stored in the search memory 13, so as to determine an output port of a packet to be outputted from the MAC 20.

As the output port of the packet is determined, the search engine 21 outputs an ending signal to the control unit 15. In this respect, the operation for determined the output port is the same as in the conventional art, thus, detailed description of which is omitted here.

Accordingly, before the MAC 20 completes the detecting operation of the packet, the search engine 21 already determines the output port of the packet to be outputted to the FIFO 4a after being detected from the MAC 20.

That is, since the time during which the MAC 20 detects the destination address and the source address from the packet is quite short compared the time for detecting data, the search engine 21 has enough time to determine the output port of the packet while the MAC 20 is detecting the data.

Accordingly, when the packet with the output port determined is outputted from the MAC 20, the control unit 15 directly outputs the packet to FIFO 4b of the output port, rather than storing it in the packet memory 14, in case that a corresponding output port is not busy.

Meanwhile, upon checking, if the output port is busy, the control unit 15 stores the packet in the packet memory 14 through the FIFO 5a, and when the output port is available, it outputs the packet in the same way as in the conventional art.

As mentioned above, in the first embodiment of the present invention, the search engine receives the destination address and the source address from the MAC on a real-time basis, and determines the output port of the corresponding packet while the MAC is processing the other remaining field information of the packet.

Accordingly, since the processing operation of the packet in the MAC and the output port determining operation by the search engine are simultaneously performed, no transfer delay occurs as in the conventional art.

In addition, according to the first embodiment of the present invention, in case that the output port is not busy at the time when the packet is outputted, the control unit directly outputs the packet to the FIFO connected to the output port, so that the size of the FIFOs between the MAC and the packet memory and the size of the packet memory can be reduced as a whole. Consequently, an improved Ethernet switch system can be realized by using a fewer resource.

Generally, the time taken for the MAC 20 to detect the source address and the destination address of the packet makes up approximately 10% of the total packet processing time by the MAC and the processing time of the data of 46~1500 byte takes up most of the time thereof.

Thus, even after the address searching is completed, more than 90% of the search engines 21 respectively connected to the MAC 20 are in an idle state until the packet process operation by the MAC 20 is completed and then the search engines process the next packet.

Figure 4:
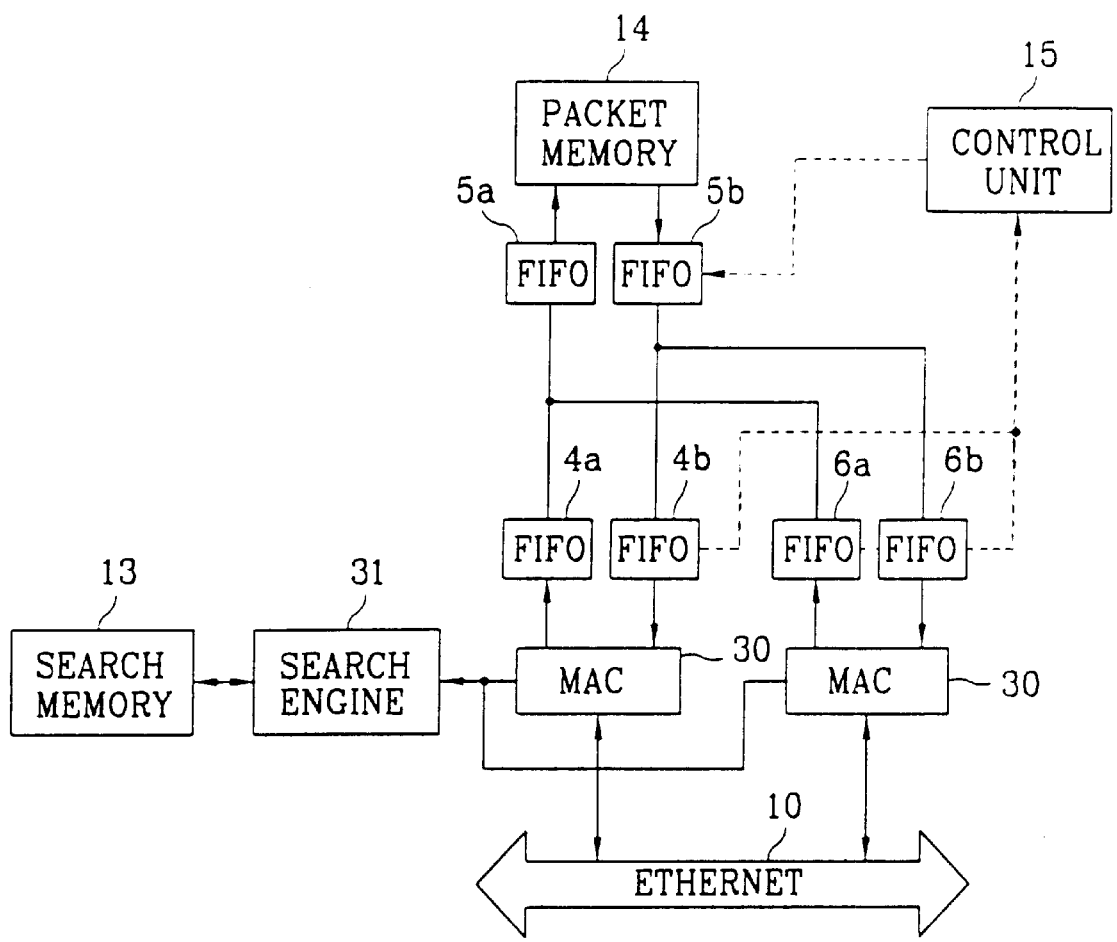
FIG. 4 is a schematic block diagram of an apparatus for processing a data packet of an Ethernet switch system in accordance with a second embodiment of the present invention.

Accordingly, as shown in FIG. 4, an apparatus for processing a data packet of an Ethernet switch system in accordance with the second embodiment of the present invention has a structure for promoting an efficiency in use of the search engine.

That is, a plurality of MACs 30 hold a single search engine 31 in common, and the search engine 31 has an operation speed faster than that of the MAC 30.

Operation of the second embodiment of the present invention is the same as that of the first embodiment, and thus, detailed description is omitted.

Thus, according to the second embodiment of the present invention, since the address searching for the plurality of MACs 30 is performed by the single search engine, the present invention has an advantage in that the efficiency in use of the search engine can be highly promoted for a switch system including 10 MAC ports.

As so far described, the present invention adopts the structure in which the plurality of MACs and the single search engine is implemented on the same layer and the single search engine is connected to every MAC. Accordingly, the search engine performs the address searching operation and determines the output port of the packet while the packet is being processed by the MAC, so that the speed in transferring the packet is much increased.

In addition, in case that the output port is not busy at the time point when the packet is outputted from the MAC, the corresponding packet is directly outputted to the FIFO of the output port, rather than being stored in the packet memory, so that the FIFO between the MAC and the packet memory and the size of the packet memory can be reduced as a whole.

Also, by having the structure of the plurality of MACs and the single search engine implemented on the same layer and the MACs connected to the single search engine in common, the efficiency in use of the search engine can be highly promoted for a layer 2 Ethernet switch system.

It will be apparent to those skilled in the art that various modifications and variations can be made in the apparatus for processing data packets of Ethernet switch system and method thereof of the present invention without departing from the spirit or scope of the invention. Thus, it is intended that the present invention cover the modifications and variations of this invention provided they come within the scope of the appended claims and their equivalents.

What is claimed is:

1. An apparatus for processing a data packet of an Ethernet switch system in which packet information is transferred from a first device to a second device based on a field information of the packet inputted through an Ethernet, comprising:

at least one MAC for detecting the field information of the packet received from the first device through the Ethernet; and at least one search engine for determining an output port of the packet to be outputted to the second device based on a source address and a destination address provided from the MAC on a real-time basis before the MAC completes the detecting operation of the packet, wherein the search engine is directly connected to the MAC, and the MAC and the search engine are positioned on the same layer.

2. The apparatus according to claim 1, wherein more than one MAC is commonly connected to a single search engine.

3. The apparatus according to claim 1, comprising the same number of the MACs and search engines so that the each of the search engines is connected to one of the MACs.

4. The apparatus according to claim 1, further including a control unit for checking whether the output port is busy or not.

5. The apparatus according to claim 4, wherein the control unit stores the packet in a packet memory when the output port is busy.

6. An apparatus for processing a data packet of an Ethernet switch system, comprising:

at least one MAC for detecting the packet from a bit stream;

a search memory where MAC addresses are stored;

at least one search engine positioned at the same layer with the MAC and determining an output port of the packet before the MAC completes the detecting operation of the packet based on an address detected and provided by the MAC on a real-time basis and the MAC address searched in the search memory, wherein the search engine is directly connected to the MAC;

FIFOs for buffering the packet detected by the MAC; and a control unit for performing an overall control operation.

7. The apparatus according to claim 6, wherein the search engine searches a port of the search memory corresponding to an inputted destination address and determines the output port of the packet if the destination address provided by the MAC is already stored in the search memory.

8. The apparatus according to claim 6, comprising the same number of the MACs and search engines so that the each of the search engines is connected to one of the MACs.

9. The apparatus according to claim 8, wherein the MACs and the search engines have a same operation frequency that is lower than an operation frequency of the search memory.

10. The apparatus according to claim 6, wherein more than one MAC is commonly connected to a single search engine.

11. The apparatus according to claim 10, wherein the operation speed of the search engine is faster than that of the MACs.

12. The apparatus according to claim 6, wherein the control unit directly outputs the packet detected by the MAC to a FIFO of the output port when the output port is not busy.

13. The apparatus according to claim 6, further includes a packet memory for storing the packet outputted from the MAC through the FIFO when the determined output port is not available for use.

14. A method for processing a data packet of an Ethernet switch system in which packet information is transferred from a first device to a second device on the basis of field information of the packet inputted through an Ethernet, comprising the steps of:

detecting a first address from the packet inputted to a predetermined input port of at least one MAC through the Ethernet;

determining an output port of the packet with at least one search engine before the MAC completes the detecting operation of the packet based on the first address provided from the MAC on a real-time basis and a MAC address stored in a search memory, wherein the MAC and the search engine are positioned on a same layer;

checking whether the output port is available for use or not; and transferring the packet detected from the MAC to the Ethernet through the output port.

15. The method of claim 14, wherein the first address is one of a source address and a destination address.

16. The method according to claim 14, wherein more than one MAC is provided and commonly connected to a single search engine.

17. The method according to claim 14, wherein the same number of the MACs and the search engines are provided so that the each of the search engines is connected to one of the MACs.

18. The method according to claim 14, wherein an operation frequency of the search engine is higher than that of the MAC.

19. The method according to claim 14, wherein the transferring step includes the steps of:

checking and determining whether the output port is busy or not;

transferring the packet detected from the MAC through the output port if the output port is not busy; and temporarily storing the packet detected from the MAC in a packet memory and then transferring it if the output port is busy.

\* \* \* \* \*